UNITED STATES PATENT OFFICE.

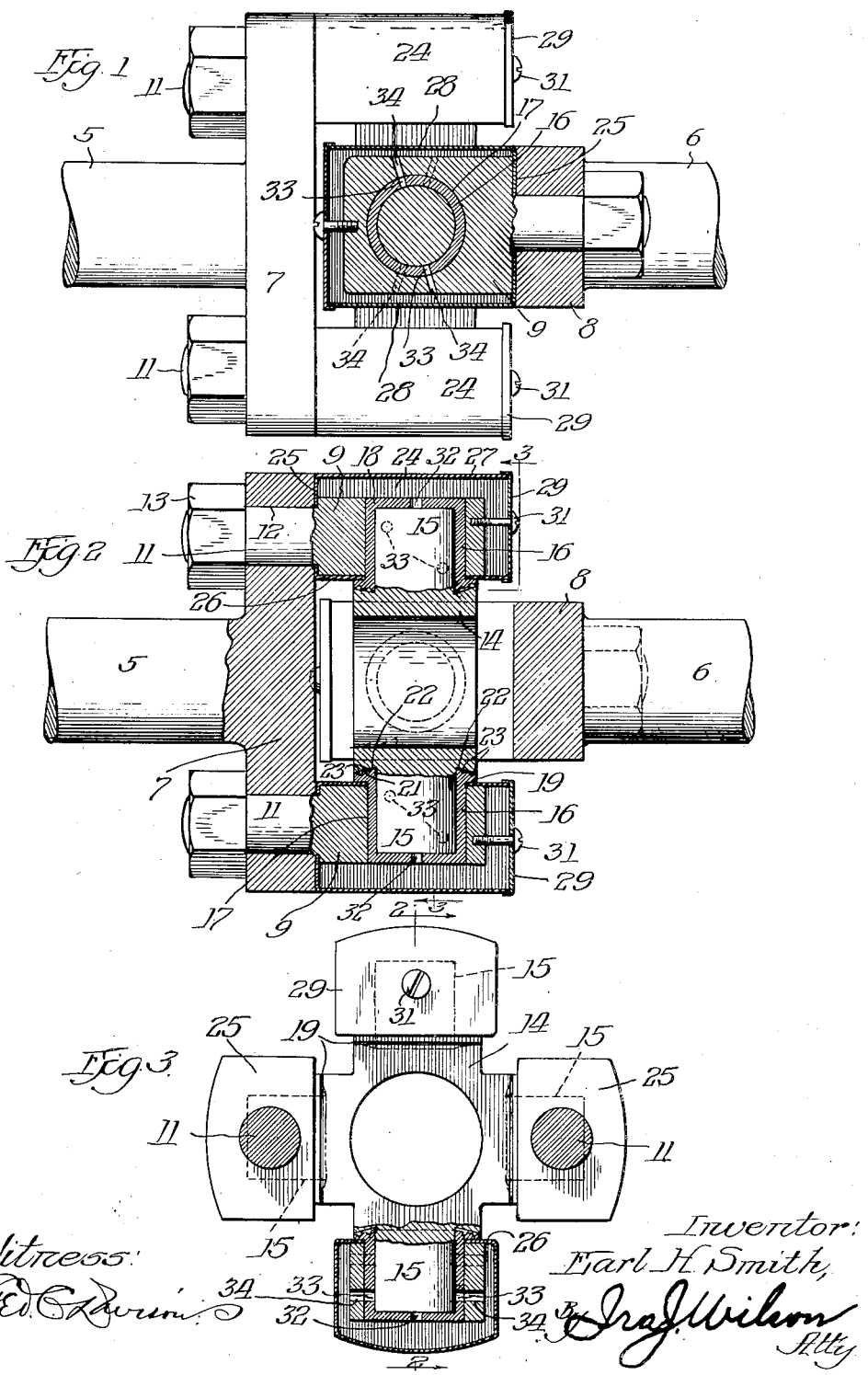

EARL H. SMITH, OF INDIANAPOLIS, INDIANA.

UNIVERSAL JOINT.

1,412,577.  Specification of Letters Patent.  Patented Apr. 11, 1922.

Application filed March 14, 1921. Serial No. 452,180.

*To all whom it may concern:*

Be it known that I, EARL H. SMITH, a citizen of the United States, residing at Indianapolis, in the county of Marion and State of Indiana, have invented certain new and useful Improvements in Universal Joints, of which the following is a specification.

This invention relates to universal joints adapted for power transmission, and while the present design is particularly suitable for automobile construction, it should be understood that the joint is capable of use for a wide variety of purposes.

One of the primary objects of my present invention is to provide a joint of the character indicated, which will be simple in construction, cheap to manufacture, and one which will be reliable and durable in operation.

With these and other objects in view, my invention contemplates a joint in which the lubricant, instead of being carried in a chamber centrally of the joint, is carried in containers surrounding the bearings, and is adapted to be supplied to the bearings from the containers, as required, the construction being such that centrifugal force serves to feed the lubricant to the bearings and to prevent it from leaking out around the bearings.

Another feature of my invention resides in the construction by which the end thrusts of the bearing trunnions, instead of being taken by the shoulders at the bases of the trunnions, are resisted at the outer ends of the trunnions, where sufficient lubrication is furnished under the action of centrifugal force.

A further feature resides in the tapered shoulders at the bases of the bearing trunnions which are designed to utilize the action of centrifugal force for the prevention of the entrance of dirt into the bearings, and also the leakage of lubricant therefrom.

Other advantageous features and many of the inherent advantages of this invention should be readily appreciated as the same becomes better understood, by reference to the following description, when considered in connection with the accompanying drawings.

Referring to the drawings:

Fig. 1 is a plan view, partially in section, of a joint embodying my invention;

Fig. 2 is a longitudinal central sectional view through the joint taken on the line 2—2 of Fig. 3; and Fig. 3 is a transverse sectional view on the line 3—3 of Fig. 2.

Referring now to the drawings more in detail, reference characters 5 and 6 indicate the shafts which are connected through the joint, one of these shafts 5, for instance, being the driving shaft, and 6, the driven shaft. These shafts are equipped at their opposed ends with transversely extending heads 7 and 8 respectively, to the outer faces of which are connected bearing elements 9. One of these shafts, with its head and bearing elements, may be considered as the driving member, and the other, with its head and bearing elements, may be considered as the driven member. The elements 9 may be formed integrally with their respective hubs 7 and 8, but preferably for purposes of assembly, one or both of the elements of each pair is provided at its attaching end with a bolt extension 11 passed through a suitable opening 12 in the head, and equipped with a nut 13 threaded onto the projecting end of this extension, by which the element is rigidly secured to the head.

The driving and driven members are flexibly connected together by means of a central spider or block 14, equipped with four radially projecting bearing trunnions 15, each engaged with one of said bearing elements. It will thus be manifest that a flexible connection between the driving and driven shafts is established, since swinging movement in one direction is provided by one pair of trunnions, and swinging movement at right angles thereto is provided by the other set of trunnions.

These trunnions, instead of having a direct bearing fit with their respective bearing elements, are each provided with a bushing 16 fitted around each trunnion, and also snugly fitting within the bearing opening 17 in each bearing element. It will be observed from Fig. 2 that each of these bushings comprises an end wall 18 overlying the end of its trunnion, and that at its inner end, each bushing is equipped with a radially projecting flange 19, which flange limits the outward movement of the bushing with respect to its bearing element so that the bushing is adapted to resist the end thrust of its trunnion. The inner edge or face of this flange is tapered, as indicated by reference character 110

21, and at the base of each trunnion, a shoulder 22 is formed on the spider 14, which shoulder is also correspondingly tapered, and is disposed in opposed relation to the tapered face of the bushing flange. This flange face is also provided with one or more annular grooves 23, which serve as lubricant retainers. It will be observed that the bushing flange faces 21 are spaced from the shoulders 22 to provide sufficient clearance so that no end thrusts of the spider or its trunnions will be imparted by these shoulders 22 to the bushings, but on the contrary, this clearance is always maintained, and all of the end thrusts are absorbed and resisted by the end walls 18 of the bushings. Lubrication, therefore, between the opposed faces 22 and 21, is unnecessary, and the tapered formation of these faces is provided for the dual purpose of excluding the entrance of dust and dirt into the bearings, since centrifugal force would tend to throw any dust and dirt outwardly away from the clearance provided between these tapered surfaces, and, for keeping the lubricant away from the center of the joint, since any that might work out between these opposed faces will be thrown outwardly from the ends of the spaces by centrifugal force when the joint is in operation.

For the purpose of lubricating the trunnions, my invention, instead of carrying the lubricant in the spider 14 as is customary, contemplates the provision of an individual lubricant retainer for each trunnion so that all of the lubricant is carried outside a circle inscribed by the shoulders 22 as the joint is revolved. Each lubricant retainer comprises a housing 24, surrounding its bearing element 9, the inner end wall 25 of each housing being provided with an opening through which the bolt extension 11 passes, and the inner longitudinal wall 26 being provided with an opening through which the bushing 16 extends. This wall lies snugly against the inner face of its bearing element 9, and is compressed around the bearing opening by the bushing shoulder 19, as will be observed from Fig. 2. The outer longitudinal wall 27 of each container is spaced some distance from the opposed face of its bearing element, and likewise, the radial longitudinal walls 28 are arranged in spaced relation from the sides of the bearing element. The outer end wall 29 of each retainer is preferably made removable in order to permit the retainer to be packed with lubricant, and while this wall may be attached in any suitable manner, I have shown, for purposes of illustration, an attaching screw 31 which passes through the wall and is threaded into the end of the bearing 9. By simply removing this screw, access to the interior of the retainer may be had.

When these retainers are packed with grease, or any suitable lubricant, it will be manifest that all of the lubricant is disposed radially outwardly beyond the shoulders at the bases of the bearing trunnions, and that centrifugal force, when the joint is running, will tend to force the lubricant under pressure into the outer portions of these retainers. From the point where the lubricant will be collected by centrifugal force, I propose to deliver the lubricant under its pressure to the ends of the trunnions 15 through openings 32 in the end walls 18 of the bushings, and since all end thrust of the trunnions comes at this point, it will be apparent that adequate lubrication of the trunnion ends is provided for. For the further purpose of lubricating the trunnions intermediate their ends, I may also provide one or more lubricant feeding apertures 33, at each side of the bushings, which apertures are disposed in alignment with channels 34 formed in the sides of the bearing elements and communicating at their outer ends with the lubricant retainers, as will be apparent from Fig. 1.

By the construction above described, the side thrusts of the joint, or in other words, the end thrusts of the bearing trunnions are resisted at the ends of the trunnions, and the individual lubricant retainers communicating with these end thrust surfaces insure the adequate lubrication of these surfaces, and likewise, the lateral channels provide for lubrication of the perimeters of the trunnions so that all of the moving parts are adequately lubricated, while at the same time, the lubricant is kept away from the central part of the joint and the joint is thereby kept clean and free from an accumulation of dirt, which would have a tendency to work into the bearing parts. Furthermore, the clearance between the shoulders at the bases of the trunnions and the opposed faces of the bushings insures that no thrust will be absorbed at this point, and consequently, there will be no wear on these surfaces and the tapered formation tends to exclude dust and dirt from entering the joint, and also retains the lubricant, and should any escape, it will be thrown outwardly instead of collecting at the center of the joint.

It is believed that my invention, its construction, and many of its attendant advantages will be understood from the foregoing without further description, but manifestly, the specific embodiment of the invention shown and described is capable of wide modification and variation within the scope of the invention, as defined in the following claims.

I claim:

1. A universal joint, comprising driving and driven members provided with bearings, a spider having trunnions journaled in said bearings, means disposed over the ends of said trunnions for resisting the end thrust thereof, and an individual lubricant retainer surrounding each bearing remote from the spider for supplying lubricant to the ends of said trunnions.

2. A universal joint, comprising driving and driven members provided with bearings, a spider having trunnions journaled in said bearings, a bushing embracing the sides and end of each trunnion and provided at its inner end with a flange engaging the bearing so that end thrusts of the trunnion are resisted by said bushings, and an individual lubricant retainer surrounding and carried by each bearing.

3. A universal joint, comprising driving and driven members provided with bearings, a spider having trunnions journaled in said bearings, a circumferential shoulder at the inner end of each trunnion, a bushing disposed within each bearing around the periphery and over the end of the trunnion therein, said bushing being provided at its inner end with a circumferential flange engaging the perimeter of said bearing and spaced from said shoulder so that end thrust of the trunnion is resisted by that portion of the bushing opposed to the end of the trunnion, and means for supplying lubricant to said bearings.

4. A universal joint, comprising driving and driven members provided with bearings, a spider having trunnions journaled in said bearings and provided with an inclined shoulder at the base of each trunnion, a bushing embracing the sides and end of each trunnion and having its inner end engaged with the bearing and disposed in spaced relation to said shoulder, and an individual lubricant retainer for each bearing.

5. A universal joint, comprising driving and driven members provided with bearings, a spider having trunnions journaled in said bearings, a bushing interposed between the sides of each trunnion and its bearing, said bushings engaging the ends of the trunnions to resist end thrusts of said trunnions, an individual lubricant retainer attached to and surrounding each bearing, and channels through said bushing for conducting lubricant from said container to said trunnion.

6. A universal joint, comprising driving and driven members, each including a pair of arms provided with bearings, a spider having radially disposed trunnions journaled in said bearings, a lubricant container carried by each of said arms, a bushing interposed between each trunnion and its bearing and provided with openings through which lubricant is delivered to the trunnion from the surrounding container, and an outwardly tapered shoulder formed at the base of each trunnion, said bushings having their inner ends correspondingly tapered and opposed to said shoulders.

EARL H. SMITH.